(12) United States Patent
Fodor et al.

(10) Patent No.: US 11,174,940 B2
(45) Date of Patent: Nov. 16, 2021

(54) MANUAL TRANSMISSION WITH ELECTRIC CLUTCH

(71) Applicant: Ford Global Technologies, LLC, Dearborn, MI (US)

(72) Inventors: Michael Glenn Fodor, Dearborn, MI (US); Patrick J. Curran, Northville, MI (US); Matthew John Shelton, Grosse Ile, MI (US); Peter Douglas Kuechler, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 364 days.

(21) Appl. No.: 16/225,645

(22) Filed: Dec. 19, 2018

(65) Prior Publication Data

US 2020/0200259 A1 Jun. 25, 2020

(51) Int. Cl.
*F16H 59/00* (2006.01)
*F16H 59/02* (2006.01)
(Continued)

(52) U.S. Cl.
CPC ........... *F16H 59/0217* (2013.01); *F16H 3/02* (2013.01); *F16H 61/688* (2013.01); *F16H 2059/0221* (2013.01); *F16H 2306/18* (2013.01)

(58) Field of Classification Search
CPC ............. F16H 59/0217; F16H 59/0278; F16H 59/105; F16H 59/044; F16H 61/688; F16H 61/0248; F16H 61/682; F16H 61/2807; F16H 3/02; F16H 2306/18; F16H 2059/0221; F16H 63/46; F16H 69/12
See application file for complete search history.

(56) References Cited

U.S. PATENT DOCUMENTS 5,002,166 A * 3/1991 Leigh-Monstevens ...................... B60W 10/02
192/3.58
5,667,044 A * 9/1997 Choi .................... B60W 10/02
192/3.58

(Continued)

FOREIGN PATENT DOCUMENTS

CN 205373744 U 7/2016
GN 203756972 U 8/2014

(Continued)

OTHER PUBLICATIONS

Video clip entitled "VW Volkswagen Golf Ecomatic Promo Video" uploaded by user redcarracer1 published on Dec. 31, 2014, Retrieved from Internet https://www.youtube.com/watch?v=wMtrWfurToE.

*Primary Examiner* — Victor L MacArthur
(74) *Attorney, Agent, or Firm* — Vincent Mastrogiacomo; Brooks Kushman P.C.

(57) ABSTRACT

A vehicle includes an powerplant, a manual transmission, and a clutch. A vehicle controller is programmed to automatically control operation of the clutch allowing the driver to shift gears by just operating the gear shifter. The vehicle also includes an input allowing the driver to override the controller and operate the clutch. The input is located on the gear shifter and is in electric communication with the controller. The controller is programmed to, inter alia, command the clutch to reduce clutch capacity responsive to receiving a signal from the sensor indicating grasping of the shifter.

11 Claims, 4 Drawing Sheets

(51) Int. Cl.
F16H 61/688 (2006.01)
F16H 3/02 (2006.01)

(56) References Cited

U.S. PATENT DOCUMENTS

| | | | | |
|---|---|---|---|---|
| 6,296,072 | B1* | 10/2001 | Turner | B62M 11/18 |
| | | | | 180/220 |
| 6,978,691 | B2 | 12/2005 | Katakura | |
| 2013/0096793 | A1* | 4/2013 | Krosschell | F16H 63/067 |
| | | | | 701/68 |
| 2018/0187774 | A1* | 7/2018 | McLemore | B60W 30/143 |

FOREIGN PATENT DOCUMENTS

| | | |
|---|---|---|
| GN | 105547345 A | 5/2016 |
| GN | 103821929 B | 7/2016 |

* cited by examiner

MANUAL TRANSMISSION WITH ELECTRIC CLUTCH

TECHNICAL FIELD

This disclosure relates to vehicles having a manual transmission with an electric clutch.

BACKGROUND

Motor vehicles include an engine having a crankshaft driveably connected to a transmission. The transmission includes a gearbox for changing a speed ratio between the crankshaft and a transmission output shaft. The transmission may be a manual transmission in which a driver manually shifts gears within the gearbox via a shifter. A dry friction clutch selectively couples the crankshaft to a transmission input shaft. The clutch includes a clutch disc splined to the transmission input shaft and a pressure plate that frictionally engages the disc with a flywheel of the crankshaft to transmit power from the engine to the transmission. The clutch is operated by the driver via a clutch pedal. The clutch pedal is mechanically connected to a throw-out bearing via linkages. Depression of the clutch pedal pushes the throw-out bearing into the spring to modify the clutch capacity and thus control the transfer of power between the engine and the transmission.

SUMMARY

A vehicle includes an powerplant, a manual transmission, and a clutch. A vehicle controller is programmed to automatically control operation of the clutch allowing the driver to shift gears by just operating the gear shifter. The vehicle also includes an input allowing the driver to override the controller and operate the clutch. The input is located on the gear shifter and is in electric communication with the controller. The controller is programmed to, inter alia, command operation of the clutch based on signals from the input.

According to one embodiment, a vehicle includes a powerplant, a manual transmission having a shifter having a sensor configured to sense grasping of the shifter, and an electric clutch selectively coupling the powerplant and the transmission. A vehicle controller is programmed to, responsive to receiving a signal from the sensor indicating grasping of the shifter, command the clutch to reduce clutch capacity.

According to another embodiment, a vehicle includes a powerplant, a manual transmission having a shifter with a switch, and an electric clutch selectively coupling the engine and the transmission. A controller is programmed to, responsive to (i) the switch being activated and (ii) the shifter being in gear, open the clutch to decouple the powerplant from the transmission.

According to yet another embodiment, a vehicle includes a powerplant, a manual transmission having a shifter with a sensor configured to sense grasping of the shifter, and a clutch having a clutch disc selectively coupling the powerplant and the transmission and an electric actuator controllable to increase and decrease capacity of the clutch. A vehicle controller is programmed to, responsive to receiving a signal from the sensor indicating grasping of the shifter, command the electric actuator to reduce clutch capacity.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
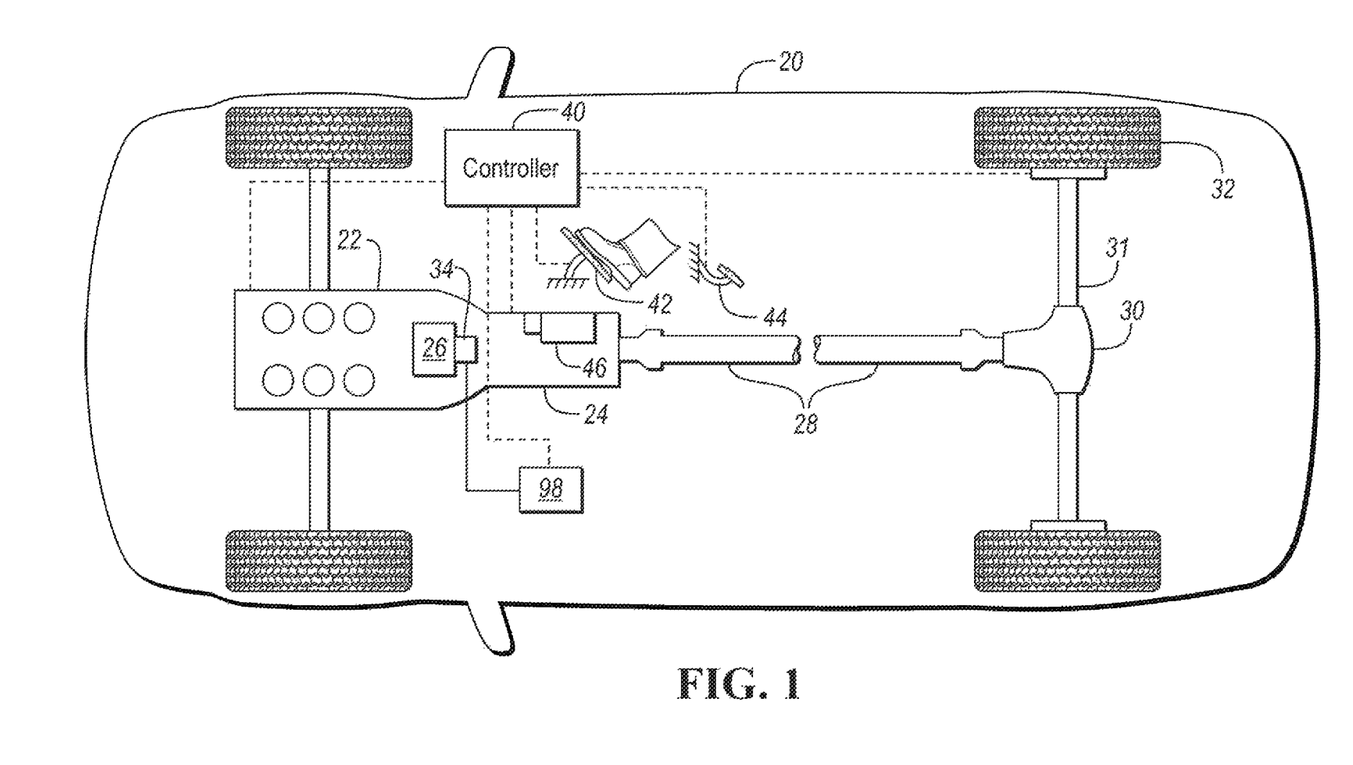
FIG. 1 is a schematic diagram of a manual-transmission vehicle with an electric clutch.

Referring to FIG. 1, a vehicle 20, such as a passenger car, SUV, or pickup truck, includes a powerplant such as the illustrated engine 22, one or more electric machines, or a combination of both. The engine 22 may be coupled to an input shaft of a transmission 24 via a dry friction clutch 26. The transmission 24 is a manual transmission including a gearbox configured to establish various power-flow paths between the input shaft and a transmission output shaft in response to movement of a driver-operated gear shifter. Used herein, "manual transmission" refers to a transmission in which the shift forks are operated manually by the driver via the gear shifter located within the passenger cabin. The vehicle 20 may be rear-wheel drive in which the transmission output shaft is driveably connected to the differential 30 via a driveshaft 28. The differential 30 is driveably connected to the driven wheels 32 via one or more axles 31. Two components are driveably connected if they are connected by a power flow path that constrains their rotational speeds to be directly proportional. In other embodiments, the vehicle may be front-wheel drive, all-wheel drive, or four-wheel drive.

The clutch 26 is an electric clutch that is operated primarily by a controller 40 rather than the driver. That is, the vehicle 20 need not include a clutch pedal. The vehicle 20, however, may include a clutch pedal in some embodiments. The electric clutch 26 includes at least one actuator 34 operable to control torque capacity of the clutch 26. The actuator 34 may be electric and controlled by the controller 40. In one embodiment, the actuator 34 includes a master cylinder controlled by the controller 40 and a slave cylinder fluidly connected to the master cylinder and configured to actuate the clutch 26 between engaged and disengaged positions. Embodiments of the actuator 34 will be described in more detail below.

The vehicle 20 also includes an accelerator pedal 42 and a brake pedal 44. The accelerator pedal 42 may be mechanically connected to a throttle body of the engine 22 in order to control operation of the engine, or may be electronically connected to the controller 40, which controls operation of the throttle body according to signals received from the accelerator pedal 42. The transmission 24 may include one or more sensors 46—such as speed sensors, torque sensors, and gear sensors—in electric communication with the controller 40.

While illustrated as one controller, the controller 40 may be part of a larger control system and may be controlled by various other controllers throughout the vehicle 20, such as a vehicle system controller (VSC). It should therefore be understood that the powertrain control unit 40 and one or more other controllers can collectively be referred to as a "controller" that controls various actuators in response to signals from various sensors to control functions of the vehicle. The controller 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle. The controller may communicate with the other vehicle components via a data bus or dedicated wires.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 2:
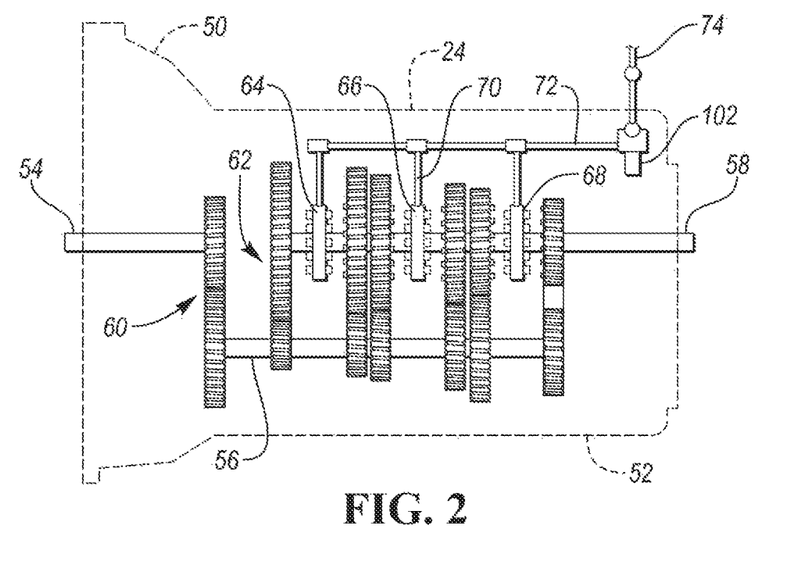
FIG. 2 is a schematic diagram of a manual transmission.

Referring to FIG. 2, the transmission 24 includes a bell housing 50 mounted to the engine block, and a gearbox 52 that houses the various gears of the transmission. The transmission 24 includes an input shaft 54 selectively connected to the engine 22 via the clutch 26. A countershaft 56 meshes continuously with the input shaft 54 via gearing 60. A transmission 24 output shaft 58 continuously meshes with the countershaft 56 via the drive gear pairs 62. The transmission of the illustrated embodiment is a five-speed transmission with reverse; thus the transmission includes five forward gear pairs and one reverse gear pair. The synchronizers 64, 66, and 68 selectively lock the output shaft 58 to the countershaft 56 at one of the speed ratios in order to transmit power from the input shaft 54 to the output shaft 58. Each of the synchronizers may include an associated shift fork 70 connected to a shift rod 72 that is in turn connected to a gear shifter 74.

Movement of the gear shifter 74 by the driver cause one of the shift forks to slide the associated synchronizer into engagement with an associated gear placing the transmission into the driver-selected gear (e.g., first gear). FIGS. 1 and 2 illustrate and describe a rear-wheel-drive manual transmission, however, it is the understood that the teachings of this disclosure are equally applicable to front-wheel-drive manual transmissions and all-wheel-drive manual transmissions.

Figure 3:
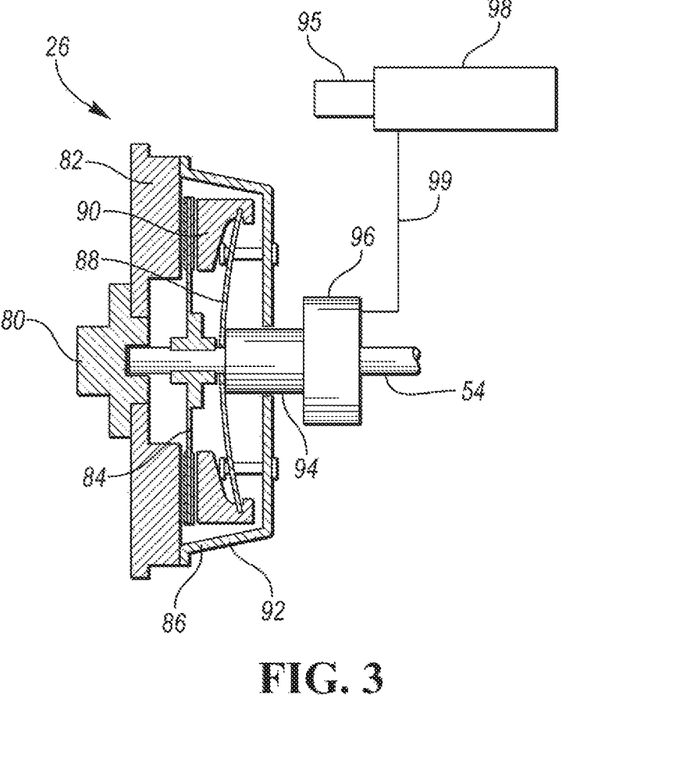
FIG. 3 is a partial cross-sectional view of a dry friction electric clutch.

Referring to FIG. 3, the electric clutch 26 may be a dry friction clutch that selectively couples the engine crankshaft 80 to the transmission input shaft 54. The clutch 26 includes a clutch disc 84 splined to the transmission input shaft 54. The clutch disc 84 is configured to fictionally engage a flywheel 82 that is fixed on the crankshaft 80 to transmit power from the crankshaft 80 to the input shaft 54. The clutch disc 84 may include a dampener that provides torsional isolation between the engine and the driveline when the clutch is engaged. The disc 84 may include a friction material attached to the front and back sides of the disc.

A pressure plate assembly 86 of the clutch 26 includes a cover 92 fixed to the flywheel 82, and a diaphragm spring 88 attached to the cover 92. A pressure plate 90 is biased, by the spring 88, to frictionally engage the disc 84 with the flywheel 82. A bearing 94 (commonly referred to as a throw-out bearing) is slidably received on the input shaft 54. Axial movement of the bearing 94 controls the position of the diaphragm spring 88 and thus controls the amount of force the pressure plate 90 is exerting on the disc 84. Movement of the bearing 94 towards the disc 84 decreases the clutch capacity and movement of the bearing 94 away from the disc 84 increases the clutch capacity. In the illustrated embodiment, the bearing 94 is connected to an on-axis slave cylinder 96 of actuator 34 that is configured to axial slide the bearing 94 based on fluid pressure from a master cylinder 98. The slave cylinder 96 and the master cylinder 98 are connected in fluid communication via one or more hydraulic lines 99. The slave cylinder 96 may be located in or on the bell housing and the master cylinder 98 may be located in the engine bay.

The controller 40 reduces clutch capacity of the clutch 26 by commanding an actuator 95 to compress fluid in the master cylinder 98, which applies apply hydraulic pressure to the slave cylinder 96. This causes the slave cylinder 96 to actuate the bearing 94 towards to spring 88 to reduce contact pressure between the disc 84 and the flywheel 82. The controller 40 increases clutch capacity of the clutch 26 by commanding the actuator 95 to decompress fluid in the master cylinder 98, which allows the spring 88 to slide the bearing 94 away from the clutch 26 to increase contact pressure between the disc 84 and the flywheel 82. The illustrated hydraulic system is one of many different types of hydraulic systems contemplated by this disclosure. Additionally, the clutch system is not limited to hydraulic systems. For example, an electric actuator may slide the bearing 94.

The controller 40 is programmed to operate the clutch 26 automatically. That is, the controller 40 is programmed to determine the appropriate clutch capacity based on vehicle speed, gear ratio, etc. The controller 40 is in electric communication with a plurality of sensors that provide real-time signals indicative of various operating conditions allowing the controller 40 to appropriately control the clutch 26. For example, the vehicle 20 may include wheel speed sensors 100, transmission speed sensors 46, and a gear-recognition sensor 102.

Referring back to FIG. 2, the gear recognition sensor 102 may be mounted to the gear-shifter assembly and is configured to sense movement of the shifter 74. The gear-recognition sensor 102 is able to determine which gear the shifter 74 is in and is able to determine when the driver is shifting gears. Using signals from the sensor 102, the controller 40 can determine shift initiation by the driver and anticipate which gear the driver is shifting to.

Popularity of manual transmissions has declined due to certain inherent features of the manual transmissions currently on the market. For example, driving a manual vehicle in stop-and-go traffic can be cumbersome. Despite these drawbacks, many people, especially driving enthusiasts, prefer the increased driver interaction that manual transmissions offer. Including an electric clutch (e.g., clutch 26 described above) can eliminate some of the negative attributes of increased driver interaction with the vehicle. Inclusion of the electric clutch 26 allows the computer to take over clutch operation allowing the driver to focus on the more enjoyable aspects of driving a manual-transmission vehicle. By removing the negative aspects of the manual transmission, popularity of manual transmission may be increase. While the controller 40 is capable of operating the clutch 26 without input from the driver, it may be advantageous to allow the driver to also control the clutch 26. The vehicle 20 may include an input that allows the driver to adjust clutch capacity, e.g., engage or disengage the clutch, manually. The input may be located on the gear shifter 74. The input may be a button, a switch, a toggle, a sensor, or any device that can be actuated by the driver. In some embodiments, the input may be a clutch pedal that sends signals to the controller 40 rather than directly controlling the clutch.

Figure 4:
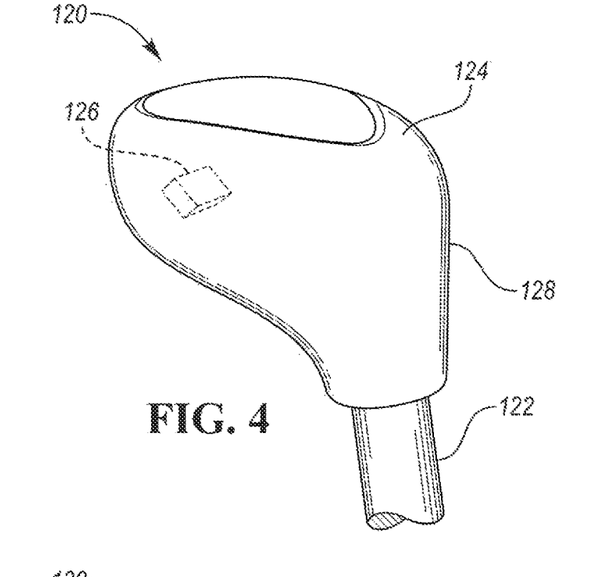
FIG. 4 is a schematic diagram of a gear shifter.

Referring to FIG. 4, a gear shifter 120 may include a shaft 122 and a knob 124. The knob 124 includes an input in the form of a sensor 126 configured to sense grasping of the shifter. The sensor 126 is disposed within the outer shell 128 of the knob 124. The outer shell 128 is flexible, at least in some areas, allowing the driver to slightly deform, i.e., crush, the knob 124. The sensor 126 is disposed within the knob 124 and is configured to measure deformation of the outer shell 128 to determine that the driver has grasped the gear shifter 120. The sensor 126 may be configured to sense a magnitude of squeeze pressure, based on deformation of the outer shell 128, and output a signal to the controller 40 indicative of the sensed squeeze pressure. In one or more embodiments the sensor 126 is a potentiometer. The sensor 126 may be used to not only sense grasping of the knob 124, but also to sense a magnitude of squeeze pressure applied to the knob 124 by the driver. The latter allows the driver to control clutch capacity by modulating squeezing of the knob 124. In some embodiments, the controller 40 may be programmed to fully open the clutch 26 responsive to squeezing being sensed or, alternatively, may be programmed to command a specific clutch capacity based on the magnitude of squeeze being applied by the driver much like clutch pedal travel does on a traditional manual-transmission vehicle. That is, squeezing the knob 124 harder decreases clutch capacity and squeezing the knob 124 softer increases clutch capacity.

Figure 5:
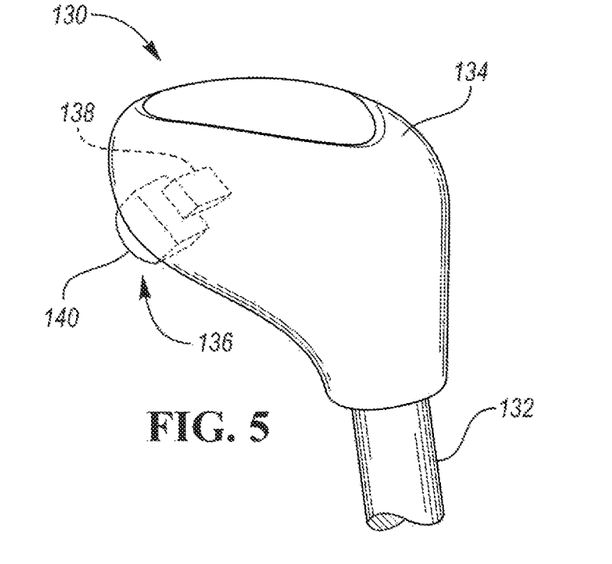
FIG. 5 is a schematic diagram of another gear shifter.

Referring to FIG. 5, another gear shifter 130 includes shaft 132 and a knob 134. The knob 134 includes an input in the form of a switch 136. The switch 136 includes a sensor 138 disposed within the knob 134 and an actuatable member 140 that at least partially protrudes from the knob 134. The actuatable member 140 is movable relative to the knob 134 so that the driver may depress the actuatable member 140 to actuate the switch 136. In one embodiment, the actuatable member 140 is a button, which may be in the form a trigger, that extends from the front side of the knob 134. The switch 136 is operated by depressing the trigger 140 into the knob 134. The sensor 138 is configured to sense movement of the actuatable member 140 and send a signal to the controller 40 indicative of a position of the actuatable member 140. The switch 136 may be depressed by the driver to indicate grasping of the shifter 130 and/or to control torque capacity of the clutch 26.

Depending upon the embodiment, the input may be used to determine grasping of the shifter, to allow the driver to control clutch capacity, or both. Different inputs are better suited for different embodiments. For example, the shifter 120 is better suited from controlling a range of clutch capacities, whereas both shifters 120 and 130 are well suited for detecting grasping of the shifter and for requesting opening of the clutch.

Figure 6:
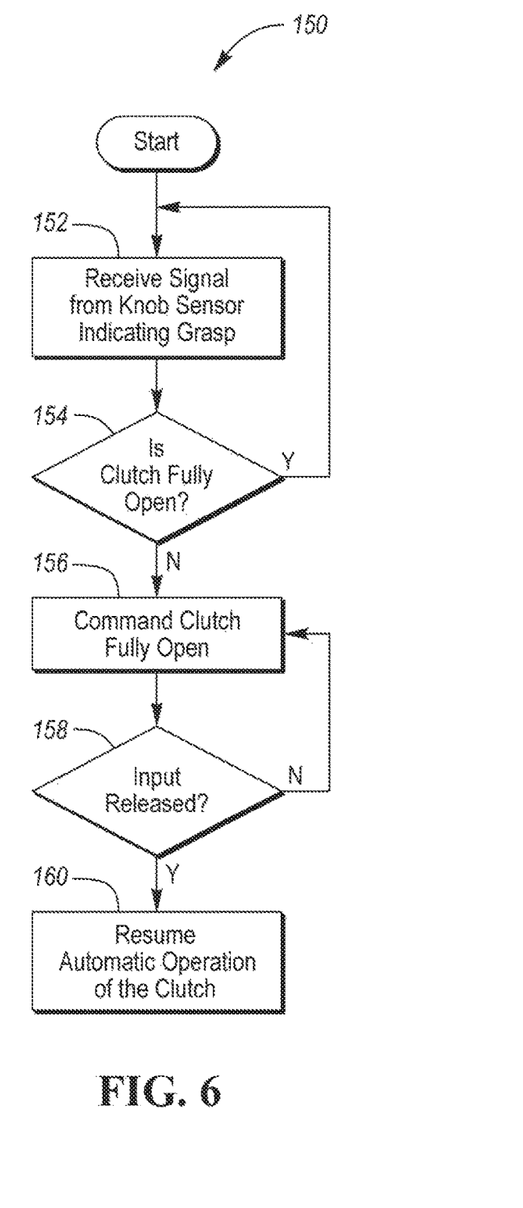
FIG. 6 is a flow chart illustrating an algorithm for controlling a clutch with a user-controlled input.

FIG. 6 illustrates a flow chart 150 of an algorithm for controlling clutch capacity based on signals from a knob sensor, e.g., sensor 126 or 138. At operation 152, the controller receives signals from the knob sensor indicating grasping of the shifter. The knob sensor may send the signals responsive to the input being actuated by the driver. At operation 154, the controller determines if the clutch is fully open, i.e., zero clutch capacity. If no, the controller commands the clutch fully open at operation 156. The controller may command opening of the clutch by sending a signal to an actuator of the electric clutch. For example, the controller may send a signal to the electric actuator associated with the master cylinder to stroke the piston within the master cylinder so that the slave cylinder drives the bearing into the diaphragm spring disengaging the disc from the flywheel. If the clutch is already fully open, control loops back to the start. The controller determines if the input is released at operation 158. The controller may determine that the input is released responsive to not receiving a signal from the knob sensor. If the driver has released the input, control passes to operation 160 and the controller resumes automatic operation of the clutch. In many situations, the controller closes the clutch at operation 160. For example, the controller is programmed to close the clutch to couple the engine to the transmission responsive to the shifter being in gear, the clutch being open, and the input being released. If no at operation 158, control loops back to operation 156.

In the greater context of operating the vehicle 20, the controls 150 not only allow the driver to open the clutch on demand but also provide the controller with an additional input for shift preparation. The gear-recognition sensor does not sense shifting until the shifter moves. In most situations, the gear-recognition sensor senses shifting soon enough to allow the controller to open the clutch and execute a clean shift. During very quick shifts, however, it is difficult to fully open the clutch on-time when shifting is determined solely by the gear-recognition sensor. When shifting, a driver first grips the knob prior to moving the shifter. The input is located on the knob and is able to sense a driver's intent to shift prior to moving the gear shifter. That is, the knob-mounted input can detect a shift earlier than the gear-recognition sensor. This allows the controller to begin opening the clutch sooner to ensuring proper operation of the clutch during even the fastest of gear shifts.

Figure 7:
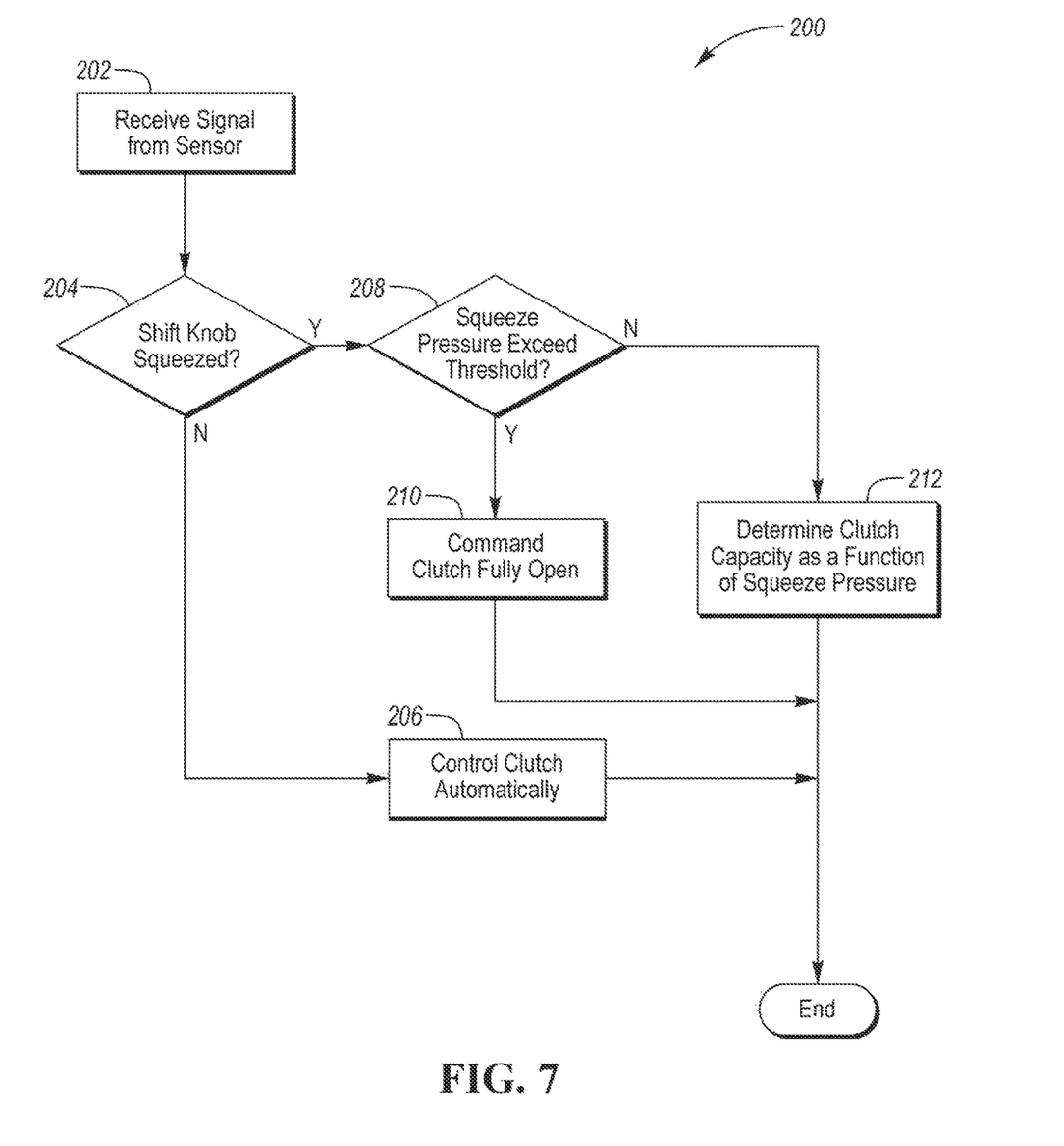
FIG. 7 is a flow chart illustrating an algorithm for controlling clutch capacity with squeeze pressure applied to a shift knob.

FIG. 7 illustrates a flow chart 200 of an algorithm for controlling clutch capacity based on squeeze pressure applied to a shifter knob. Generally, clutch capacity decreases as squeeze pressure increases and clutch capacity increases as squeeze pressure decreases. By modulating the squeeze pressure applied to the shifter knob, the driver can adjust clutch capacity much like a driver adjusts clutch capacity in a traditional manual by depressing or releasing the clutch pedal.

The flowchart begins at operation 202 where the controller receives a signal from the sensor, e.g., sensor 126, indicative of knob squeeze pressure. At operation 204, the controller determines if the shift knob is squeezed. The controller may classify the shift knob as being squeezed or not squeezed based on a lower squeeze-pressure threshold. If the squeeze pressure exceeds the threshold, the controller determines that the shift knob is squeezed. This allows the controller to ignore light squeezing of the knob, which may be inadvertent and not meant to trigger actuation of the clutch. If no at operation 204, control passes to operation 206 where the controller controls the clutch automatically without input from the driver.

If the knob is determined to have been squeezed at operation 204, control passes to operation 208 and the controller determines if the squeeze pressure has exceeded an upper squeeze-pressure threshold. The upper threshold is used to determine if the controller fully opens the clutch or sets clutch capacity as a function of squeeze pressure. If the squeeze pressure exceeds the upper threshold at operation 208, control passes operation 210 in the clutch is commanded to the fully open position, i.e., zero clutch capacity. If the squeeze pressure is less than the upper threshold, control passes to operation 212 and the controller commands a clutch capacity as a function of squeeze pressure. At operation 212, the controller operates the electric actuator of the clutch system to reduce clutch capacity as squeeze pressure increases and to increase clutch capacity as squeeze pressure decreases. This allows the user to manually control the clutch.

In some embodiments, the controller may intervene and remove control from the driver despite squeezing of the shifter knob to prevent undesirable consequences such as stalling of the engine. For example, if the user reduces squeeze pressure too quickly without supplying sufficient engine torque, the controller will intervene and maintain clutch capacity at a reduced level to prevent stalling of the engine. Similarly, the controller may maintain the clutch closed despite the driver squeezing the knob to prevent an undesirable driving condition.

The above-described input allows for the vehicle 20 to have all of the advantages of an electric clutch while also providing increased user control so that a driver can exert manual operation of the clutch as desired. For example, the input may allow a driver to invoke idle coasting without shifting to neutral by simply actuating the input such as pressing a button or squeezing the shift knob.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a powerplant;
a manual transmission including a shifter having a sensor configured to sense grasping of the shifter wherein the sensor is configured to measure squeeze pressure on the shifter;
an electric clutch selectively coupling the powerplant and the transmission; and
a controller programmed to, responsive to receiving a signal from the sensor indicating grasping of the shifter, command the clutch to reduce clutch capacity, wherein the reduction of clutch capacity is based on the measured squeeze pressure.

2. The vehicle of claim 1, wherein the clutch is commanded to reduce clutch capacity to zero.

3. The vehicle of claim 1, wherein the clutch capacity decreases as squeeze pressure increases.

4. The vehicle of claim 3, wherein the clutch capacity increases as squeeze pressure decreases.

5. The vehicle of claim 1, wherein the shifter has a knob and the sensor is disposed in the knob.

6. The vehicle of claim 5, wherein the knob includes an outer shell that is configured to deform when grabbed by a person's hand, wherein the sensor is configured to measure deformation of the outer shell and output a signal indicative of a squeeze pressure applied to the knob.

7. The vehicle of claim 6, wherein the sensor is a potentiometer.

8. The vehicle of claim 1, wherein electric clutch includes a clutch disc and a hydraulic system having a master cylinder that is electrically controlled by an actuator and a slave cylinder that engages and disengages the clutch disc with the engine according to fluid pressure supplied by the master cylinder.

9. The vehicle of claim 1, wherein the powerplant is an engine.

10. A vehicle comprising:
a powerplant;
a manual transmission including a shifter having a sensor;
a clutch including a clutch disc selectively coupling the powerplant and the transmission and an electric actuator controllable to increase and decrease capacity of the clutch; and
a controller programmed to, responsive to receiving a signal from the sensor indicating squeeze pressure on the shifter, command the electric actuator to reduce clutch capacity based on the measured squeeze pressure.

11. The vehicle of claim 10, wherein the controller is further programmed, responsive to a signal from the sensor indicating release of the shifter, command the electric actuator to increase clutch capacity.

* * * * *